US009179341B2

(12) United States Patent
Corson (10) Patent No.: US 9,179,341 B2
(45) Date of Patent: Nov. 3, 2015

(54) METHOD AND SYSTEM FOR SIMPLIFYING WIFI SETUP FOR BEST PERFORMANCE

(71) Applicant: Sony Computer Entertainment Inc., Tokyo (JP)

(72) Inventor: Gregory A. Corson, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 130 days.

(21) Appl. No.: 14/213,413

(22) Filed: Mar. 14, 2014

(65) Prior Publication Data

US 2014/0273877 A1 Sep. 18, 2014

Related U.S. Application Data

(60) Provisional application No. 61/790,567, filed on Mar. 15, 2013.

(51) Int. Cl.
*H04B 17/00* (2015.01)
*H04W 24/06* (2009.01)

(52) U.S. Cl.
CPC .................................... *H04W 24/06* (2013.01)

(58) Field of Classification Search
CPC ...... H04W 4/008; H04W 24/06; H04W 24/08
USPC ......... 455/500, 67.11, 67.13, 67.7, 550.1, 73, 455/41.2
See application file for complete search history.

(56) References Cited

U.S. PATENT DOCUMENTS

| | | | |
|---|---|---|---|
| 7,440,428 B2 | 10/2008 | Bates et al. | |
| 7,548,230 B2 | 6/2009 | Corson | |
| 7,694,223 B2 | 4/2010 | Corson | |
| 8,156,539 B1 * | 4/2012 | Nelson | H04L 63/107 455/456.1 |
| 8,164,566 B2 | 4/2012 | Corson | |
| 8,395,658 B2 | 3/2013 | Corson | |
| 8,427,426 B2 | 4/2013 | Corson et al. | |
| 8,723,794 B2 | 5/2014 | Corson et al. | |
| 2003/0054811 A1 * | 3/2003 | Han | H04W 24/00 455/423 |
| 2004/0246921 A1 | 12/2004 | Bates et al. | |
| 2004/0261026 A1 | 12/2004 | Corson | |

(Continued)

OTHER PUBLICATIONS

U.S. Appl. No. 61/790,567, to Gregory A Corson, filed Mar. 15, 2015.

*Primary Examiner* — Tuan Pham
(74) *Attorney, Agent, or Firm* — Joshua D. Isenberg; JDI Patent (57) ABSTRACT

Performance of WiFi devices, including WiFi access points are affected by a variety of parameters, including the location of setup of device and nearby sources of interference. Optimization of WiFi setup is enabled via quality metrics observed by the WiFi device and provided to the user. The system enables a user to change conditions that affect connection performance, such as the location of the WiFi access point, while the system automatically measures performance for each set of conditions. The system can then determine for the user which set of conditions provides the system with optimized WiFi connection performance. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

47 Claims, 3 Drawing Sheets

(56) References Cited

U.S. PATENT DOCUMENTS

| | | |
|---|---|---|
| 2005/0015452 A1 | 1/2005 | Corson |
| 2006/0267935 A1 | 11/2006 | Corson |
| 2008/0062257 A1 | 3/2008 | Corson |
| 2009/0213072 A1 | 8/2009 | Corson |
| 2009/0288127 A1 | 11/2009 | Corson et al. |
| 2010/0130195 A1* | 5/2010 | Rohaly ............... H04W 24/06 455/425 |
| 2010/0194687 A1 | 8/2010 | Corson et al. |
| 2010/0214214 A1 | 8/2010 | Corson et al. |
| 2011/0238731 A1 | 9/2011 | Corson |
| 2014/0273877 A1 | 9/2014 | Corson |
| 2014/0280847 A1 | 9/2014 | Corson |
| 2014/0280974 A1 | 9/2014 | Corson |

* cited by examiner

METHOD AND SYSTEM FOR SIMPLIFYING WIFI SETUP FOR BEST PERFORMANCE

FIELD OF THE DISCLOSURE

Aspects of the present disclosure relate to WiFi setup and optimization of WiFi device performance.

BACKGROUND OF THE DISCLOSURE

When setting up an 802.11 wireless (WiFi) access point (AP) to connect with other WiFi devices users are often unaware of the optimal environment in which to place the device and are often unaware of environmental factors that cause connection errors and degrade system performance. Furthermore, the AP and other WiFi devices connected to the AP do not typically provide a user with information regarding various metrics of WiFi system performance or a mechanism that enables the user to locate the WiFi devices in an optimal environment.

Existing WiFi access points feature some automatic setup systems, but these are usually limited to attempting to choose a relatively unused WiFi channel. Performance of a WiFi network (e.g., home or office) can vary considerably depending on the location of the WiFi access point (AP) and connecting devices, and other environmental factors.

Furthermore, most WiFi users have the option of locating their AP and other WiFi devices in several different places or affecting other environmental factors of the WiFi devices. A location could be in a different room, or something as basic as moving the AP to a higher or lower shelf in a bookcase.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

DETAILED DESCRIPTION

When installing a WiFi device, the user usually has several choices of the environment for the device, and especially the location. Finding an optimal location (particularly for a WiFi access point) can improve performance. This can be as simple as moving the WiFi device to a higher shelf or placing it farther from an interfering device, such as a neighbor's or other WiFi device, household appliances, consumer electronics, etc.

In some aspects of the present disclosure, a WiFi device is moved to various possible locations by the user. A connection is established with the WiFi device, and the device automatically measures network performance at the various locations. The system then suggests the best location for the WiFi device, or otherwise provides the user with information regarding network performance at the various locations for the WiFi device once all desired potential locations have been tested. Measurements could be brief or done over long periods of time to catch transient problems, such as, e.g., interference cause by household appliances and other interfering devices being used for relatively brief periods of time. Types of measurements include, but are not limited to, scanning for interference, testing bandwidth to each device, and checking error rates and tests on different WiFi channels.

In some aspects of the present disclosure, once a location is chosen, the WiFi device can continue to run regular tests or measurements to monitor performance of the WiFi network, alerting the user if the performance degrades due to some new source of interference, such as from an appliance or new WiFi device. The procedure can be repeated, if necessary, to find a new optimal location.

In some aspects of the present disclosure, these measurements are performed by the AP, as the WiFi radios in an AP are generally more configurable and easier to access than a WiFi module built into a PC or other consumer electronic (CE) device.

In some aspects of the present disclosure, optimization of WiFi setup is performed in a home environment where there may be several computers (PCs) and/or a number of other WiFi consumer electronic (CE) devices such as webcams, set-top-boxes (STBs), game consoles, smart phones, etc. When performing the testing, the AP is not required to be connected to the internet. Some wired or WiFi devices can be connected to the AP via a web browser to act as user interface to guide the user through the tests. Alternatively, a display on the AP itself could be used.

Figure 1:
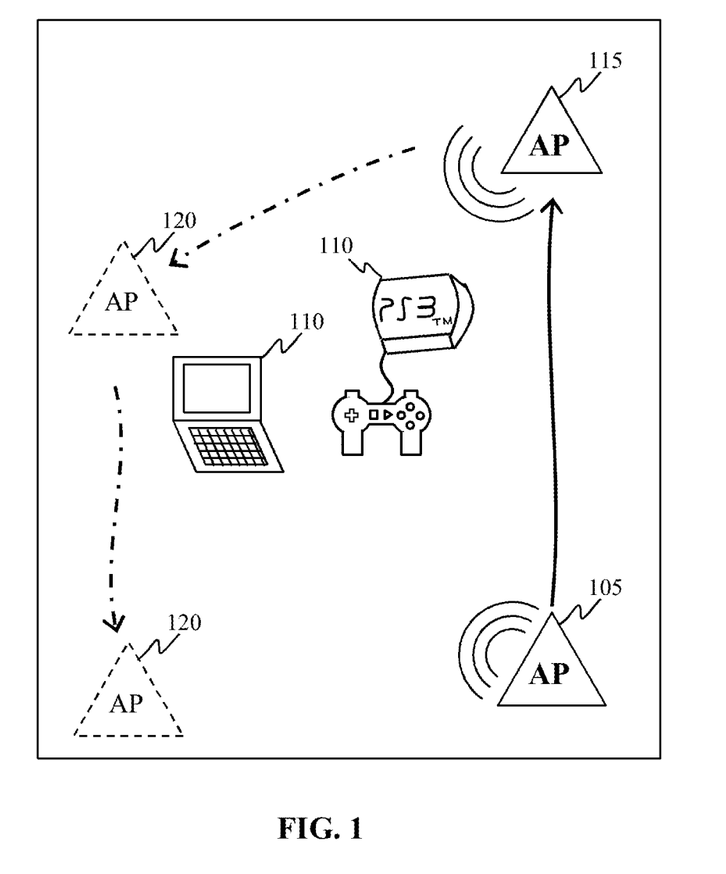
FIG. 1 is schematic diagram illustrating a WiFi setup optimization sequence according to various aspects of the present disclosure.

An example of a WiFi setup optimization system and method according to aspects of the present disclosure is depicted in FIG. 1.

First, an AP may be setup in a first possible location 105 in the environment and turned on. The AP then automatically performs a scan of available WiFi channels in order to determine a best choice of channel for this first location.

Next, a user establishes a WiFi connection to the AP with one or more WiFi devices 110 in the environment. Simply establishing a connection with the AP allows for measurements to be made, and it is not necessary for the AP to be connected to the internet. Connecting to the AP using a web browser or other user interface enables various types of webapps to be run on the one or more WiFi devices 110 (i.e. client devices) that are connected to the AP. This enables detailed information to be captured about the quality of the WiFi connection. A client device could also run a custom-written application to assist in testing the WiFi connection.

Next, the AP may be left alone for a period of time to record data about the connection and the quality of performance of WiFi connection with the one or more WiFi devices 110 connected to the AP. Running the quality measurements for a longer period of time can improve the metrics of the setup by enabling the system to capture transient problems not present when the connection is initially established, such as, e.g., temporary interference from an intermittently used household appliance. Data can collect for the quality measurements can include standard radio specs such as, e.g., signal strength, signal-to-noise ratio, general signal quality over time, packet loss, etc. For clients running a webapp or custom app, connection speed tests and error rates can also be run. After a period of time, the measurements are stopped and the results are stored.

Next, the user may move the AP to an alternate location 115 (or changes some other environmental parameter that affects connection quality). The tests may then be performed again for the new location 115 (e.g., initialized automatically by establishing a connection or upon initializing of the quality by the user through the system's user interface). Most WiFi devices 110 can automatically reconnect to an AP if it is shut off and turned back on in a new location, even if the AP changes channels. So for each test, many devices may automatically perform the step of reestablishing a connection with the AP.

The tests may be repeated for all additional convenient locations 120 or as many possible locations of the AP as desired (i.e., can be repeated for n different possible locations). The AP can then review the data it has gathered and determine a best location for the AP that provides the best average quality for all the WiFi devices 110 that were connected to it. Accordingly, the user can setup the AP in that location and enjoy an optimized WiFi network.

Once the AP is set up in the preferred location, the AP may continue to record statistics about the quality of all WiFi connections in the home. Things like moving furniture, turning appliances on and off, or nearby devices that use WiFi frequencies could change the quality of the network over time. If the AP detects a change, the user can be alerted that there is a problem with the network. Appropriate action can be taken user, such as eliminating the interference, moving the AP, or initializing the setup process described above again to determine a new location of the AP or set of environmental parameters that provide optimized WiFi connection performance In FIG. 2, an example of a method 200 for optimizing WiFi performance in accordance with various aspects of the present disclosure is depicted. The method 200 may be implemented in a system having one or more WiFi devices to be optimized. Such a system may include a processor and memory having program instructions embodied therein that are configured to perform the method 200.

Figure 2:
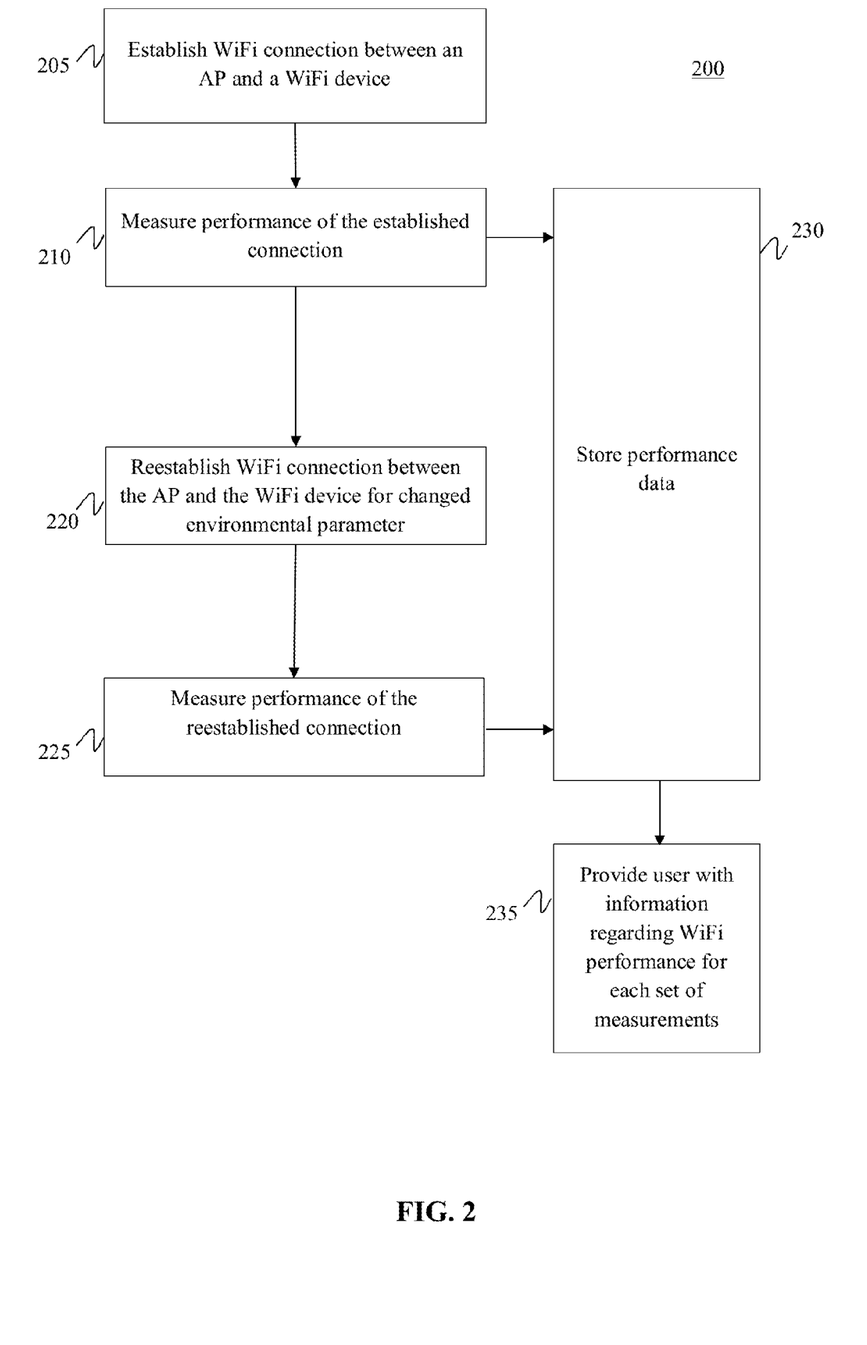
FIG. 2 is a flow diagram illustrating a method WiFi setup optimization according to various aspects of the present disclosure.

The method 200 includes establishing a WiFi connection between a WiFi device and an AP, as indicated at 205. Establishing a connection may also include establishing a connection to an AP with more than one WiFi device in order to provide more data in the setup process and better approximate conditions of subsequent use. The connection is established with a first set of environmental parameters, which in this example is the location of the AP and the location of the AP is the WiFi setup parameter being optimized. Accordingly, before establishing the connection at 205, a user may choose a first possible AP location to be tested by the device and set up the AP in that first possible location. Once the AP is set up and powered on, the AP may automatically scan available channels to determine an optimal channel to be used by the device for the initial set of parameters.

One this initial connection is established, method 200 further may include measuring the performance of the established WiFi connection between the two WiFi devices for a period of time, as indicated at 210. The period of time may be, e.g., a predetermined period of time programmed into the system, a period of time set by the user, or an indefinite period of time that is manually terminated by the user. The measurements can be, e.g., automatically initialized by the system upon establishment of the connection, initiated by the user by inputting controls to the system that initialize the test sequence, or initiated by a sensor located in the device, such as, e.g., an accelerometer or gyroscope located in the device to sense that the device is being moved. The measurements can likewise be terminated by the same to conclude the period of time for measurement.

Once the period of time is finished and the test of the first location for the AP is complete, the system may store the performance data corresponding to this first test, as indicated at 230. The user may then change an environmental parameter that is related to WiFi connection performance, which by way of example, may include moving the location of the AP. Once the new set of parameters to be tested have been established, the method 200 may include reestablishing a WiFi connection between the AP and the WiFi device, as indicated at 220, to enable new quality measurements to be taken by the system for the changed environmental parameter. Reestablishing the WiFi connection at 220 may include manually reestablishing the connection by a user or automatically reestablishing the connection by the system, e.g., by simply powering on the device or reactivating WiFi transmission on the device.

Once the connection is reestablished between the WiFi devices, the system measures performance of the reestablished connection 225 for another period of time, then stores data 230 from the measurements regarding the quality of the reestablished connection for the new location of the AP.

The steps of reestablishing a WiFi connection 220 after an environmental parameter has changed, measuring performance of the reestablished connection 225, and storing the data 230 can be repeated as many times as desired to test as many different sets of environmental parameters as the user desires to test, such as, e.g., as many different locations for the AP as the user desires to test.

One all the tests have been performed, the system can then provide the user with information 235 regarding the performance/quality of WiFi connection for each of the established connections, which in this example is the connection for each AP location. Providing the user with information 235 may generally include processing data obtained from the performance measurement steps, which can be performed automatically by the system, e.g., the AP or one of the connected WiFi devices. Processing data may generally include analyzing the data according to program instructions embodied in the system in order to provide the information to the user in an easily digestible format. That enables the user to setup the WiFi device with optimized parameters. Accordingly, the user can then optimize the performance of the WiFi network by setting up a WiFi device with the set of parameters that gave the best performance, e.g., by setting up the AP in the location that gave the best performance.

Providing the user with information 235 can be implemented in a variety of ways in order to enhance the user experience and simplify the optimization process. For example, providing the user with information 235 can include the system automatically analyzing the stored data for each test and determining which test had the best average performance over the period of time measured. By way of further example, method 200 can include determining which test resulted in the least amount of fluctuation in performance, e.g., by determining which had performance metrics with the lowest standard deviation. By way of further example, providing the user with information 235 can include ranking the WiFi performance from each test according to a set of performance criteria so that the user can have available a range of setup options that provide optimized WiFi performance. The performance criteria can involve, e.g., weighted averages of various performance metrics, such as, e.g., signal to noise ratio, packet loss, etc. By way of further example, performance criteria can utilize weights that are preprogrammed into the system to simplify the user experience, or enable the user to input weights or various individualized priorities to be utilized in ranking or determining the best set of conditions for the setup of the device, such as, e.g., inputting a set of client devices for which connection strength is most important to the user or a time of day in which WiFi performance is most important. In some implementations, providing the user with information 235 can be performed multiple times, such as after each test, rather than only providing the information once after all tests or after more than one test.

By way of example, method 200 can include geolocating the WiFi device at each location using established techniques, such as, e.g., GPS, signal strength measurements, and propagation delay. Method 200 can utilize geolocation of devices in a variety of ways, such as making suggestions to the user for optimizing WiFi device location or storing location information to correspond to each set of measurements performed in the setup process.

Figure 3:
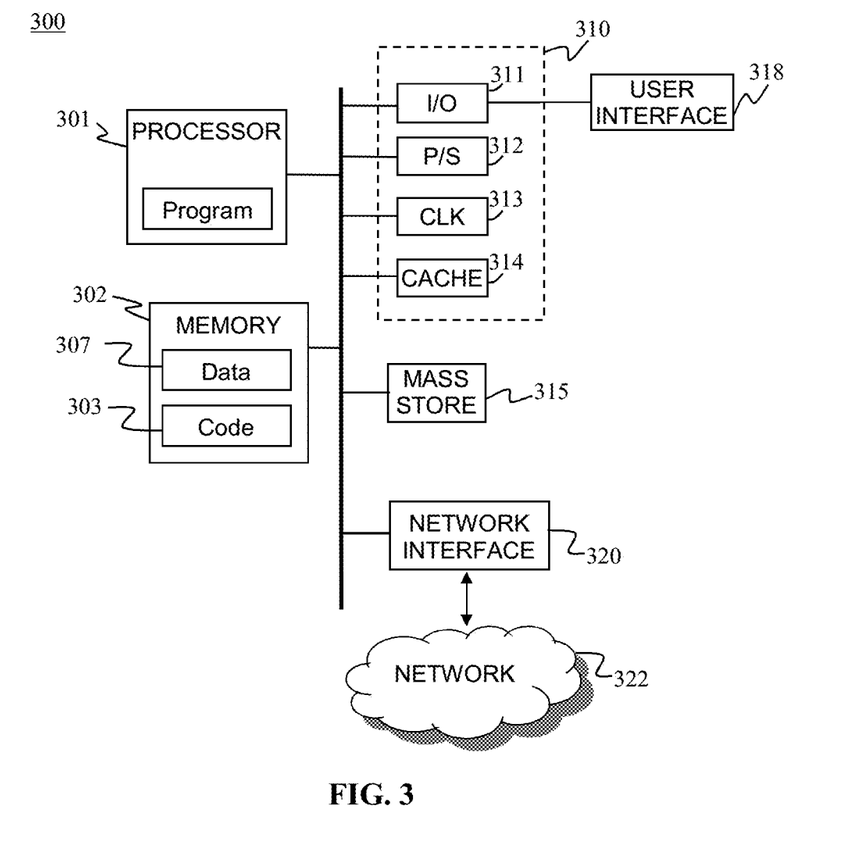
FIG. 3 is a schematic diagram of a system configured to optimize a WiFi setup according to various aspects of the present disclosure.

Aspects of the present disclosure include systems configured to optimize WiFi device setup in accordance with various aspects of the present disclosure as described herein. By way of example, and not by way of limitation, FIG. 3 illustrates a block diagram of a system 300 that may be used to implement WiFi device setup optimization according to aspects of the present disclosure. The system 300 generally may be integrated in or coupled to a WiFi device, such as a WiFi access point or a client device. The system 300 may generally include a main processor module 301, a memory 302, and a user interface 318. The processor module 301 may include one or more processor cores, e.g., single core, dual core, quad core, processor-coprocessor, Cell processor, architectures, and the like.

The memory 302 may be in the form of an integrated circuit, e.g., RAM, DRAM, ROM, and the like. The memory may also be a main memory that is accessible by all of the processor cores in the processor module 301. In some embodiments, the processor module 301 may have local memories associated with one or more processor cores or one or more co-processors. A WiFi setup program 303 may be stored in the main memory 302 in the form of processor readable instructions that can be executed by the processor module 301. The WiFi setup program 303 may be configured optimize WiFi setup in accordance with various aspects of the present disclosure. The WiFi setup program 303 may be written in any suitable processor readable language, e.g., C, C++, JAVA, Assembly, MATLAB, FORTRAN and a number of other languages.

Input or output data 307 may be stored in memory 302. During execution of the WiFi setup program 303, portions of program code and/or data 307 may be loaded into the memory 302 or the local stores of processor cores for processing the processor 301. By way of example, and not by way of limitation, the input data 307 may include data corresponding to measurements or performance tests observed with hardware in a WiFi device related to performance of the WiFi network. The data 307 may further include data received from user interface 318. The system 300 may also include well-known support functions 310, such as input/output (I/O) elements 311, power supplies (P/S) 312, a clock (CLK) 313 and cache 314. The apparatus 300 may optionally include a mass storage device 315 such as a disk drive, CD-ROM drive, tape drive, or the like to store programs and/or data.

The device 300 may also include a display unit 316 and user interface unit 318 to facilitate interaction between the apparatus 300 and a user. The display unit 316 may be in the form of a cathode ray tube (CRT), liquid crystal display (LCD), light-emitting diode (LED), or flat panel screen which may displays text, numerals, graphical symbols or images. The user interface 318 may include a keyboard, mouse, joystick, light pen, or other device that may be used in conjunction with a graphical user interface (GUI).

The apparatus 300 includes a network interface 320 to enable the device to communicate with other WiFi devices over a WiFi network 322, and the network interface 320 may also enable the device to communicate with other devices over another network, such as the internet. Hardware of the network interface 320 that is used to enable communication with other devices over WiFi network can be also configured to enable setup optimization through program instructions embedded in the WiFi setup program 303 according to various aspects of the present disclosure. Network interface 320 may include hardware, such as a radio antenna, which may be configured to not only transmit signals over a WiFi network 322 but also to obtain data 307 to be processed and analyzed for optimization of WiFi setup parameters according to various aspects of the present disclosure. These aspects may be implemented in hardware, software, or firmware, or some combination of two or more of these.

In some aspects of the present disclosure, if the user has mobile WiFi devices (a phone or laptop) another test could be added where the devices are placed in several locations where they would normally be used and multiple measurements could be taken. This can be used to make sure, for example, a tablet device will get equally good connections in bedroom, basement, front yard, etc. It would also be possible to walk the mobile device around the entire covered area and produce maps of good/bad coverage that the AP could use when deciding where it should be placed.

In some aspects of the present disclosure, the user could indicate to the system that some devices are more important than others. For example they could indicate that locations should be chosen that favor getting a good connection at the home's main laptop or desktop computer, while giving lower priority to things like WiFi enabled appliances (e.g., thermostats, etc.) that don't require a high quality connection. Accordingly, the system could utilize user input performance metrics in determining optimal setup.

In some aspects of the present disclosure, depending on the hardware and local situations, it is possible to geolocate the AP and some or all of the client devices using established techniques (GPS, measuring signal strength, propagation delay, etc.). This enables the AP to build up a picture of how far it is from each device and the locations of potential interfering devices. This can be used, for example, so that the AP can make suggestions to the user for optimizing WiFi performance (e.g., move "15 feet to the north") to avoid interference from, e.g., a household appliance or a neighbor's AP.

In some aspects of the present disclosure, this process is used to help optimize conditions or find ideal locations for WiFi client devices. In this setup, the same basic process is used, but the AP can remain stationary while the client device (or its antenna) is moved by the user and tested in multiple locations.

In some aspects of the present disclosure, tests involving other environmental parameters beyond the location of the AP are performed in addition to or instead of tests of the AP location. For example, tests can be performed to help find interfering devices, such as, e.g., cordless phone base stations. The testing process can involve running the quality measurements with these other devices on and off, or with these other devices in different locations, to determine whether or to what extent they are a source of WiFi interference.

In some aspects of the present disclosure, a monitoring system can alert the user to new problems through e-mail, text message, or some other common method such as an indicator on the AP device.

In some aspects of the present disclosure, software could be installed, where possible, on client devices to facilitate continuous monitoring/testing and alert the user to network problems such as interference. Depending on the client device, this software could also have the capability of changing network settings or frequency bands automatically if the WiFi connection quality changes.

In some aspects of the present disclosure, systems and method can further include spectrum analysis. When an AP supports multiple WiFi frequency bands (such as 2.4 GHz and 5 GHz), devices could be tested for performance in each band. If the AP was capable of supporting multiple bands simultaneously, the test software could recommend which band each client device would receive the best performance.

Aspects of the present disclosure use software from a website to do QoS measurements (signal strength, packet loss, speed, throughput) with your device to determine the best location for the access point and/or your device. Access point can also listen for non-network related signals to find out what parts of the spectrum have a lot of energy. Access points already have the hardware to make the measurements.

Aspects of the present disclosure do quality measurements in day to day use to get feedback on whether the device is working or not.

Aspects of the present disclosure enable WiFi devices to pick the best channel to use. There may be interference with other devices or with sources of background noise, such as microwave ovens. The AP can scan the channels and figure out which one works best. The AP could also run tests to score the set-up, e.g., how the AP antennae are set up.

In some implementations one could run software on a wireless device that makes the wireless device emulate an access point. The device can then be used to make the spectrum measurements.

In some implementations, the AP system could monitor performance and send a message to a connected WiFi device if the performance crashes and diagnose the problem.

Various aspects of the present disclosure can be implemented in one or more APs, one or more WiFi devices connected to the one or more APs, or some combination thereof.

In some aspects, the tests can be initialized automatically simply by powering on the device. In some embodiments, the tests are not performed until initialized by a user with a suitable user input, such as, e.g., a button press, voice command, message, web input, etc.

In some aspects, the system can be configured to analyze the data and indicate to the user a best location as determined by preprogrammed system metrics. In some aspects, the system can utilize criteria input by the user.

In some aspects, the system can provide a ranking of the tested locations based on an analysis of the data from the setup process.

In some aspects, WiFi setup optimization involves changing environmental parameters that affect connection performance by the user, wherein the environmental parameters may be, e.g., location of one or more of the WiFi devices, powering on of nearby devices, moving furniture, or running tests at different times of day.

In some aspects, an interface between WiFi devices includes a web page, webapp, or some piece of software loaded onto one or more of the WiFi devices.

In some aspects, performance tests and measurements of system performance observed by the system includes well known quality metrics, such as, e.g., signal strength, signal to noise ratio, packet loss, errors, speed throughput, or other quality measurements of WiFi connection performance.

In some aspects, the system can be configured to prompt a user to perform various actions that facilitate optimization of the WiFi setup, such as, e.g., prompting the user to move the device to a new location, power on a nearby device, or otherwise change environmental parameters that affect WiFi connection performance.

Aspects of the present disclosure enable an AP to take an active role in determining where it should be placed. This can happen by automatically taking measurements and suggesting improvements based on the results. Currently, experienced network set up engineers do these steps manually and some time is required. Having the AP do it automatically eliminates the need for a network engineer and allows inexperienced home users to get a high quality WiFi setup without much work.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method comprising:
    establishing a WiFi connection between a first WiFi device and a second WiFi device;
    measuring performance of the established WiFi connection over a period of time;
    storing data in memory regarding the measured performance of the established WiFi connection;
    reestablishing the WiFi connection between the first WiFi device and the second WiFi device after an environmental parameter of the first WiFi device has changed;
    measuring performance of the reestablished WiFi connection over another period of time;
    storing data in memory regarding the measured performance of the reestablished WiFi connection;
    processing the stored data with a processor coupled to the memory; and
    providing a user with the processed data,
    wherein the processed data provides the user with information regarding the relative performance of the WiFi connection during each said period of time, and
    wherein said steps of measuring performance of the WiFi connections are performed by the first WiFi device.

2. The method of claim 1, further comprising sequentially repeating, one or more times, said reestablishing the WiFi connection, said measuring performance of the reestablished WiFi connection, and said storing data in memory regarding the measured performance of the reestablished WiFi connection.

3. The method of claim 1, wherein said environmental parameter of the first WiFi device is the location of the first WiFi device.

4. The method of claim 3, wherein the first WiFi device is a WiFi access point (AP).

5. The method of claim 3, wherein the first WiFi device is a client device.

6. The method of claim 1, wherein said changing a parameter of the first WiFi device includes powering on a nearby device.

7. The method of claim 6, wherein the nearby device is a household appliance.

8. The method of claim 7, wherein the household appliance is a microwave oven.

9. The method of claim 7, wherein the household appliance is a vacuum cleaner.

10. The method of claim 1, wherein said establishing a WiFi connection includes establishing a connection to the first WiFi device with more than one second WiFi device.

11. The method of claim 1, wherein the first WiFi device includes a videogame console.

12. The method of claim 1, wherein the second WiFi device includes a videogame console.

13. The method of claim 1, further comprising monitoring performance of a WiFi connection that is established after the user has been provided with the processed data.

14. The method of claim 13, further comprising notifying a user upon a change in performance of the WiFi connection beyond a preprogrammed amount.

15. The method of claim 1, further comprising geolocating the first WiFi device and the second WiFi device to determine the relative locations of the first WiFi device and the second WiFi device.

16. The method of claim 15, further comprising suggesting to a user a change in location of the first WiFi device based on data collected from said geolocating.

17. The method of claim 1, wherein said steps of measuring includes spectral analysis of different bands.

18. The method of claim 1, wherein each said step of measuring is initialized by a user input to the first WiFi device.

19. The method of claim 18, wherein the user input is a button press on the first WiFi device.

20. The method of claim 18, wherein the user inputs is a message sent to the first WiFi device.

21. The method of claim 1, wherein said steps of measuring include measuring signal strength, packet loss, signal to noise ratio, or a combination thereof.

22. The method of claim 1, wherein said step of processing the stored data includes determining which of said periods of time had the best average WiFi connection.

23. A method comprising:
running a test on WiFi connection performance over a period of time upon an establishment of a WiFi connection between a first WiFi device and a second WiFi device;
storing results from the test in a memory;
running another test on WiFi connection performance over another period of time upon a reestablishment of the WiFi connection between the first WiFi device and the second WiFi device;
storing results from said another test in a memory;
processing the results from each said test with a processor; and
providing information regarding performance of the WiFi connection during each said test to a user,
wherein said tests are run by the first WiFi device.

24. The method of claim 23, further comprising sequentially repeating, one or more times, said step of miming another test and said step of storing results from said another test before said step of processing results.

25. The method of claim 23, further comprising sequentially repeating, one or more times, said step of miming another test, said step of storing results from said another test, said step of processing results from each said test, and said step of providing information regarding performance of the WiFi connection.

26. The method of claim 23, wherein said step of processing results includes determining which of said tests had the best WiFi connection performance out of all of the tests.

27. The method of claim 26, wherein said determining which of said tests had the best WiFi performance includes utilizing determination criteria input by a user.

28. The method of claim 23, wherein the first WiFi device is a WiFi access point.

29. The method of claim 23, wherein the first WiFi device is a client device.

30. The method of claim 23, further comprising prompting a user to change an environmental parameter upon completion of each said test.

31. The method of claim 30, wherein the environmental parameter is the location of the first WiFi device.

32. The method of claim 31, wherein the first WiFi device is a WiFi access point.

33. The method of claim 31, wherein the second WiFi device is a WiFi access point.

34. The method of claim 23, wherein said tests are initialized automatically by the first WiFi device upon establishment of a WiFi connection with the first WiFi device.

35. The method of claim 23, wherein each said test is initialized by a user input to the first WiFi device.

36. The method of claim 35, wherein the user input is a button press on the first WiFi device.

37. The method of claim 35, wherein the user input is a message sent to the first WiFi device.

38. The method of claim 23, wherein said tests include of measurements of signal strength, packet loss, signal to noise ratio, or a combination thereof.

39. The method of claim 23, wherein said step of processing the results includes determining which of said periods of time had the best average WiFi connection performance.

40. A system comprising:
a processor;
memory coupled to the processor;
a first WiFi device coupled to the processor; and
program instructions embodied in the memory for execution by the processor, the program instructions being configured to implement a WiFi setup optimization method, the WiFi setup optimization method comprising the method of claim 1.

41. The system of claim 40, wherein the first WiFi device is a WiFi access point.

42. The system of claim 40, wherein the first WiFi device is a client device.

43. A non-transitory computer readable medium containing program instructions, wherein execution of the program instructions by one or more processors of a processing system causes the one or more processors to carry out a WiFi setup optimization method, the WiFi setup optimization method comprising the method of claim 1.

44. A system comprising:
a processor;
memory coupled to the processor;
a first WiFi device coupled to the processor; and
program instructions embodied in the memory for execution by the processor, the program instructions being configured to implement a WiFi setup optimization method, the WiFi setup optimization method comprising the method of claim 39.

45. The system of claim 44, wherein the first WiFi device is a WiFi access point.

46. The system of claim 44, wherein the first WiFi device is a client device.

47. A non-transitory computer readable medium containing program instructions, wherein execution of the program instructions by one or more processors of a processing system causes the one or more processors to carry out a WiFi setup optimization method, the WiFi setup optimization method comprising the method of claim 39.

* * * * *